United States Patent Office 3,120,523
Patented Feb. 4, 1964

3,120,523
HETEROCYCLIC ESTERS OF 3-AMINO-QUINAZO-LONE-(4) AND 3-AMINOBENZOTRIAZINONE-(4)
Siegfried Petersen, Leverkusen, Ernst Tietze, Tubingen, and Friedrich Hoffmeister and Wolfgang Wirth, Wuppertal-Elberfeld, Germany, assignors to Farbenfabriken Bayer Aktiengesellschaft, Leverkusen, Germany, a corporation of Germany
No Drawing. Filed Jan. 4, 1962, Ser. No. 164,385
Claims priority, application Germany Jan. 9, 1961
6 Claims. (Cl. 260—248)

This invention relates to therapeutically valuable derivatives of 3-aminoquinazolone-(4) and 3-aminobenzotriazinone-(4) and to methods for preparing the same. More particularly, the present invention relates to 3-aminoquinazolone-(4) and 3-aminobenzotriazinone-(4) derivatives and to methods for preparing the same from the reaction of hydrazine-monocarboxylic acid hydroxy alkyl esters and certain acid anhydrides.

Accordingly, it has now been discovered that compounds of the formula:

(I)
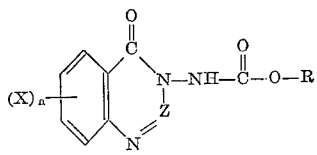

wherein R is a hydroxyalkyl radical containing at least two carbon atoms; preferably a lower alkyl radical, and particularly those containing from two to four carbon atoms; the number of hydroxy substituents varying in number from one to two and said hydroxy moiety or moieties being positioned on a carbon atom removed from that joined directly to the ester group; X, in each instance of its occurrence, is a member selected from the group consisting of nitro; halogen (the latter including, for example, chlorine, bromine and iodine); alkyl, (preferably lower alkyl, and most desirably, methyl); amino sulfamido, and acylamino radicals (e.g. acetylamino); n has a value of from 0 to 2, preferably; and Z is a nitrogen atom, a carbon atom having a hydrogen atom attached thereto, or a carbon atom having attached thereto an alkyl radical, that is a lower alkyl and halogen substituted lower alkyl, (e.g. mono- or di-halogen substituted lower alkyl), and alkoxy lower alkyl radical (e.g. wherein the alkoxy moiety contains from 1 to 4 carbon atoms), and preferably one of the aforesaid wherein the lower alkyl radical contains 1 to 3 carbon atoms; e.g. ethyl, propyl, chloromethyl, dichloromethyl, and methoxymethyl; the aforesaid hydrogen, alkyl and substituted alkyl radicals being positioned extraneous to the ring nucleus; can be prepared advantageously by the process involving the reaction of hydrazine-monocarboxylic acid hydroxy alkyl esters of the formula:

(II)
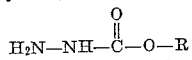
H₂N—NH—C—O—R wherein R is as defined above; with an isatoic acid anhydride or o-acylaminobenzoic acid anhydride, both being encompassed within the formula:

(III)
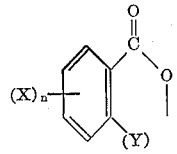

wherein each of X and n are as described above; and y is a member selected from the group consisting of

—NH—C— and

wherein the nitrogen is attached directly to the benzene nucleus and the carbon atom is, in turn, attached directly to the hetero oxygen of the resulting ring structure; and wherein R' is a hydrogen atom, an alkyl radical, that is a lower alkyl and halogen substituted lower alkyl (e.g. mono- or di-halogen substituted lower alkyl), and alkoxy lower alkyl radical, (e.g. wherein the single alkoxy moiety contains from 1 to 4 carbon atoms) and preferably one of the aforesaid wherein the lower alkyl radical contains 1 to 3 carbon atoms; e.g. ethyl, propyl, chloromethyl, dichloromethyl, and methoxymethyl; the aforesaid alkyl and substituted alkyl radicals being positioned extraneous to the ring nucleus.

The aforesaid reaction step can be carried out in water; an organic solvent such as an alcohol, e.g. lower alkane containing alkanols, such as methanol, ethanol, and the like; esters; aromatic hydrocarbons, e.g. benzene and lower alkyl substituted benzenes containing normally from one to two such substituents, such as toluene and xylene; and mixtures thereof. The reactants, ester and anhydride, are normally reacted in approximately and, indeed, substantially, equimolar amounts. The reaction temperature employed with isatoic acid anhydrides is normally within the range of 65° C. to the boiling temperature of the reaction mixture; and is such that, most desirably, a uniform carbon dioxide stream is generated.

When Y is

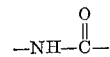
—NH—C— in Formula III above, that is when the compounds encompassed by this latter Formula III are isatoic acid anhydrides, the reaction to form the 3-aminobenzotriazinone-(4) derivatives described by Formula I above, (when Z is a nitrogen atom) involves treating about 1 mol of the reaction product of the foregoing step, an o-aminobenzoic acid- ω-carboxylic acid hydroxyalkyl ester, wherein the heterocyclic anhydride ring is cleaved; with about 1 mol of nitrous acid in the form of an alkali metal nitrite, e.g. sodium nitrite, in a medium having a pH of less than 7, employing a mineral acid, e.g. hydrochloric acid, sulfuric acid and so on or acetic acid solution.

Alternatively, when Y is

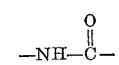
—NH—C— in Formula III as described above, the reaction product, the intermediate wherein the anhydride ring of the isatoic acid anhydride reactant has been cleaved by the hydrazine-monocarboxylic acid hydroxyalkyl ester, is reacted with formic acid, until ring closure is effected and the desired derivative of 3-aminoquinazolone-(4) is formed, this latter quinazolone-(4) being described in Formula I above when Z is a carbon atom with a single hydrogen atom attached thereto extraneous to the heterocyclic ring structure.

The aforesaid reactions may be described, illustratively, in the following manner.

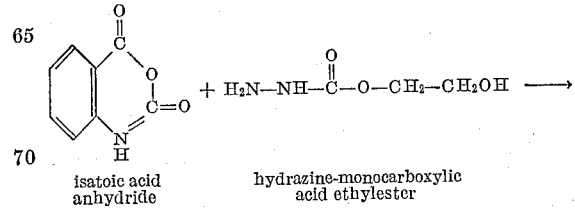

isatoic acid anhydride hydrazine-monocarboxylic acid ethylester

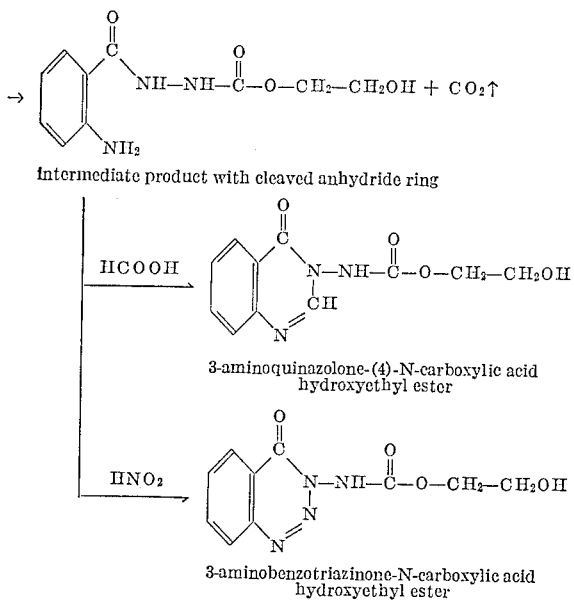

When Y is the radical $$-\underset{\underset{}{|}}{N}=\underset{\underset{}{|}}{C}-$$
$\quad\quad R'$ ring cleavage of the heterocyclic ring of the o-acylaminobenzoic acid anhydride occurs initially by virtue of the action of the hydrazinemonocarboxylic acid hydroxyalkyl esters. Subsequent closure of the quinazolone ring is effected by prolonged heating at reflux temperatures. Thus, while not wishing to be limited to a particular theory, it would appear that the aforesaid reaction proceeds, by way of illustration, as follows:

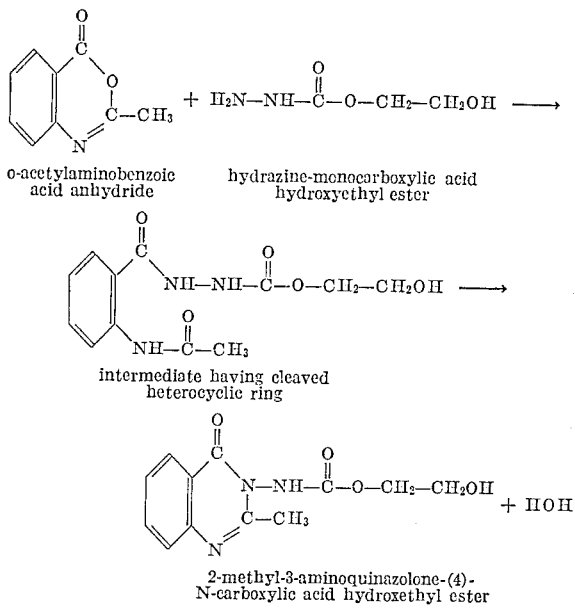

The compounds of the invention as described by generic Formula I above are well crystallized; and are thus obtained in a comparatively pure state. They can, however, be further purified by recrystallization in conventional manner.

The simplest and technically most important hydrazine-monocarboxylic acid hydroxyalkyl ester reactant employed in the practice of the present invention is hydrazinemonocarboxylic acid 2-hydroxyethyl ester which can be prepared from glycol carbonate and hydrazine. However, as indicated in the description of the generic Formula II above, other polyhydric alcohols containing the radical —CO—NH—NH$_2$, such as, for example, hydrazine-monocarboxylic acid 2-hydroxypropyl ester, hydrazine-monocarboxylic acid 3-hydroxypropyl ester and hydrazine-monocarboxylic acid 2,3-dihydroxypropyl ester, can also be suitably and desirably employed herein.

The 3-aminobenzotriazinone-(4) and 3-aminoquinazolone-(4) hydrazine-monocarboxylic acid hydroxyalkyl esters possess a pronounced muscle relaxing and analgesic activity. Moreover, the hydrophilic hydroxyl group of the side chain positioned at the number 3 carbon atom of the nucleus imparts a marked water-solubility to the compounds of the invention, even without the formation of pharmaceutically acceptable salts thereof. Such non-toxic salts, e.g. hydrochloride and the like, can of course be prepared if desired, however.

The compounds of the invention, while effecting the muscle relaxation and analgesia referred to above, exhibit a significantly reduced narcosis and sedative effect over other non-hydroxylated triazinones and quinazolones, compounds which, in addition, are substantially water-insoluble in free form, unless, of course, converted to their corresponding salts.

The following examples are further illustrative of the invention.

EXAMPLE 1

*Preparation of 3-Aminobenzotriazinone-N-Carboxylic Acid Hydroxyethyl Ester of the Formula*

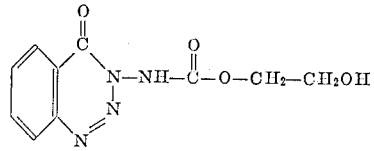

One hundred and twenty parts of hydrazinemonocarboxylic acid hydroxyethyl ester of melting point (M.P.) 88° C.–90° C. are suspended in 250 parts of alcohol. The mixture is heated to 65° C. and 160 parts (somewhat less than 1 mol) of isatoic acid anhydride are introduced within an hour in such a manner that a uniform carbon dioxide stream evolves. The mixture is then heated to boiling for an hour. The resulting o-aminobenzoic acid -ω-carboxylic acid hydroxyethyl ester as such does not crystallize, even where evaporation of the solution is effected. A crystallized hydrochloride is, however, obtained by adding about 200 parts of concentrated aqueous hydrochloric acid to the reaction solution. The yield is almost quantitative. The salt can be purified by dissolving in hot water and renewed addition of concentrated hydrochloric acid. It melts at 174° C.–175° C.

For further processing, the crude hydrochloride product is taken up with 2000 parts of ice-water and treated with 250 parts of concentrated hydrochloric acid. Sodium nitrite is then added dropwise, whereupon about 85–90% of the calculated amount is used up very rapidly at first, and somewhat more slowly towards the end. The crystalline form of the solid constituents which are at no time completely dissolved undergoes a modification. The 3-aminobenzotriazinone-N-carboxylic acid hydroxyethyl ester is precipitated with a slightly yellowish color. It can easily be dissolved in about a fourfold amount of water of 75° C. The solution is clarified with animal charcoal and the new compound is then obtained in the form of fine white rodlets which, after drying, melt at 138° C. The yield of purified compound amounts to 158–160 parts.

EXAMPLE 2

*Preparation of 3-Aminoquinazolone-(4)-N-Carboxylic Acid Hydroxyethyl Ester of the Formula*

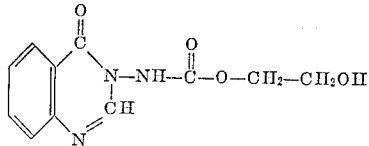

One hundred and twenty parts of hydrazine-monocarboxylic acid hydroxyethyl ester and 160 parts of isatoic acid anhydride are reacted with one another according to Example 1 and the solvent is removed under vacuum. The oily residue is then taken up with 200 parts of formic acid and the solution heated to 100° C. for two hours. The cooled mixture is carefully treated with water whereupon the product crystallizes out. For purification it is re-crystallized from methanol. Rhombs are thus obtained which melt at 150° C. Yield: 60–80 parts. The elementary analysis corresponds to a compound of the formula $C_{12}H_{11}O_5N_3$. Thus, the hydroxyl group of the 3-aminoquinazolone (4)-N-carboxylic acid hydroxyethyl ester has been simultaneously esterified with formic acid. However, this formyl radical is readily removed by standard hydrolysis.

EXAMPLE 3

*Preparation of 2-Methyl-3-Aminoquinazolone-(4)-N-Carboxylic Acid Hydroxyethyl Ester of the Formula*

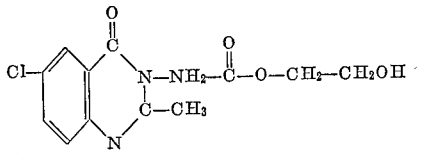

Thirty-six parts of hydrazine-monocarboxylic acid hydroxyethyl ester together with 48 parts of o-acetylaminobenzoic acid anhydride are stirred cold in 300 parts of glycol-monomethyl ether acetate whereupon a thick precipitate is formed; subsequently, the mixture is boiled under reflux until the solution is clear. Upon cooling, there crystallize out 47.5 parts of a new compound which is purified by recrystallization from alcohol. For analysis, the 2-methyl-3-aminoquinazolone-(4)-N-carboxylic acid-hydroxyethyl ester is dried at 100° C. It thereby loses crystal solvents and melts in the pure state at 146° C.

EXAMPLE 4

*Preparation of 6-Chloro-2-Methyl-3-Aminoquinazolone-(4)-Carboxylic Acid Hydroxyethyl Ester of the Formula*

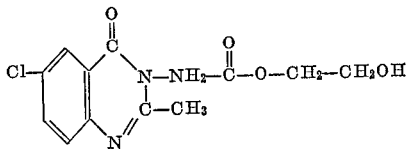

When replacing the o-acetylaminobenzoic acid anhydride used in Example 3 by 48 parts of 5-chloro-2-acetylaminobenzoic acid anhydride and otherwise proceeding in the same manner, there crystallizes upon cooling from the clear solution crystalline 6-chloro-2-methyl-3-aminoquinazolone-(4)-N-carboxylic acid hydroxyl ethyl ester in a quantity of 50 parts. The product is purified by recrystallization from glycol monomethyl ester acetate; melting point 177° C.–178° C.

EXAMPLE 5

*Preparation of 6-Nitro-2-Methyl-3-Aminoquinazolone-(4)-N-Carboxylic Acid Hydroxyethyl Ester of the Formula*

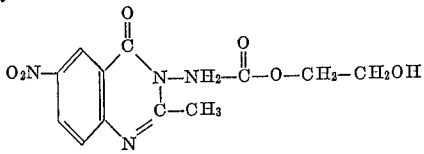

Two hundred and seven parts of 5-nitro-2-acetylaminobenzoic acid anhydride in 1000 parts of glycol monomethyl ether acetate are introduced into a vessel with stirrer and 120 parts of hydrazine-monocarboxylic acid hydroxyethyl ester are added thereto. A voluminous egg yolk-colored precipitate is formed which slowly dissolves with a brightening of color only upon heating to 120° C. The compound, 6-nitro-2-methyl-3-aminoquinazolone-(4)-N-carboxylic acid hydroxyethyl ester, slowly crystallizes from the solution as pale yellow crystals which, after recrystallization from alcohol, melt at 168° C.–170° C. Yield: 180–200 parts.

The nitro group can be reduced or further modified in conventional manner.

What is claimed is:

1. A compound selected from the group consisting of 3-aminobenzotriazinone-N-carboxylic acid hydroxyethyl ester, 3-aminoquinazolone-(4)-N-carboxylic acid hydroxyethyl ester, 2-methyl-3-aminoquinazolone-(4)-N-carboxylic acid hydroxyethyl ester, 6-chloro-2-methyl-3-aminoquinazolone-(4)-N-carboxylic acid hydroxyethyl ester, and 6-nitro-2-methyl-3-aminoquinazolone-(4)-N-carboxylic acid hydroxyethyl ester.

2. The compound, 3-aminobenzotriazinone-N-carboxylic acid hydroxyethyl ester.

3. The compound, 3-aminoquinazolone-(4)-N-carboxylic acid hydroxyethyl ester.

4. The compound, 2-methyl-3-aminoquinazolone-(4)-N-carboxylic acid hydroxyethyl ester.

5. The compound, 6-chloro-2-methyl-3-aminoquinazolone-(4)-N-carboxylic acid hydroxyethyl ester.

6. The compound, 6-nitro-2-methyl-3-aminoquinazolone-(4)-N-carboxylic acid hydroxyethyl ester.

References Cited in the file of this patent

Heller: "Journ. Fur. Pratische Chim.," NF, Volume 116, 1927, pages 1–16.

McKee et al.: "Journ Am. Chem. Soc.," Volume 69, 1947, pages 940–942.

Erickson et al.: "The 1,2,3 and 1,2,4-Triazines, Tetrazines and Pentazines," Interscience Pub. Inc., New York, 1936, pages 14, 20 and 24–26.

Rodd: Chemistry of Carbon Compounds, Volume 4, Part B, D. Van Nostrand Company, Inc., 1959, pages 1299–1300.

Chemical Abstracts, Volume 54, columns 3179, 3180, February 25, 1960.